United States Patent [19]
Dixon et al.

[11] Patent Number: 5,551,482
[45] Date of Patent: Sep. 3, 1996

[54] PLASTIC SERVOVALVE

[75] Inventors: Keith W. Dixon, Canoga Park; Leah Markowitz, Valencia, both of Calif.

[73] Assignee: HR Textron Inc., Valencia, Calif.

[21] Appl. No.: 557,984

[22] Filed: Nov. 13, 1995

[51] Int. Cl.$^6$ .............................. F15B 13/04; F16K 11/07
[52] U.S. Cl. ................... 137/625.65; 137/625.69; 156/73.1; 251/366
[58] Field of Search ......................... 137/625.65, 625.69; 156/73.1; 251/366

[56] References Cited

U.S. PATENT DOCUMENTS

| | | |
|---|---|---|
| 3,342,205 | 9/1967 | Quinto ................................. 251/366 X |
| 3,463,192 | 8/1969 | Herion . |
| 3,580,286 | 5/1971 | Bash . |
| 3,587,156 | 6/1971 | Sorenson . |
| 3,680,593 | 8/1972 | Sorenson . |
| 3,883,114 | 5/1975 | Harris et al. . |
| 3,952,996 | 4/1976 | Hart .................................... 137/625.69 |
| 3,960,166 | 6/1976 | Linser . |
| 4,021,016 | 5/1977 | Hart . |
| 4,530,486 | 7/1985 | Rusnak . |
| 4,632,148 | 12/1986 | Stark et al. . |
| 5,004,011 | 4/1991 | Linder et al. . |
| 5,222,715 | 6/1993 | Framberg . |
| 5,341,846 | 8/1994 | Framberg . |

FOREIGN PATENT DOCUMENTS

| | | |
|---|---|---|
| 2206766 | 2/1972 | Germany . |
| 2206767 | 2/1972 | Germany . |
| 2524719 | 6/1975 | Germany . |
| 2843575 | 10/1978 | Germany . |
| 3240827 | 11/1982 | Germany . |
| 3601403 | 1/1986 | Germany . |
| 5821070 | 2/1983 | Japan . |
| 1384671 | 2/1975 | United Kingdom . |

*Primary Examiner*—Gerald A. Michalsky
*Attorney, Agent, or Firm*—Robbins, Berliner & Carson, LLP

[57] ABSTRACT

Disclosed is a direct drive servovalve having a molded plastic housing. A metal sleeve having a spool valve slidably disposed therein is placed within opposed cavities formed within opposite housing halves. The housing halves are brought together under pressure and an ultrasonic horn is activated. Energy directing beads formed on the housing halves as well as interfering surfaces about the periphery melt under a pressure and ultrasonic energy allowing the two housing halves to move toward each other and mate. Upon deactivation of the ultrasonic horn, the molten plastic material cools and forms a seal about flow ports in the metallic sleeve as well as a fusion bond about the periphery of the housing.

7 Claims, 4 Drawing Sheets

PLASTIC SERVOVALVE

BACKGROUND OF THE INVENTION

Control valves for controlling the flow of fluid from a source thereof under pressure to a utilizing apparatus are well known in the prior art. Typically such valves may take the form of a metal housing having a metal sleeve containing a reciprocally slidable, spool therein for controlling the flow of the fluid. The spool may be moved within the sleeve by means of a drive motor which receives control signals from a source thereof. it has long been known that the cost of manufacturing such valves is rather high and ways to reduce the cost have been sought. one such cost reduction method is to manufacture the housing for such valves from molded plastic. Numerous attempts have been made to provide such valves. The best known prior art utilizing such structures are U.S. Pat. Nos. 3,342,205, 3,960,166, and 4,632,148 as well as British Patent 1,384,671 published Feb. 19, 1975. Of these the most pertinent is U.S. Pat. No. 3,342,205, which discloses a metallic sleeve of stainless steel around which there is molded a plastic body of a suitable thermo-setting or thermo-plastic synthetic resin composition. Disposed within the metallic sleeve is a slidable valve member which controls the flow of fluid from a source thereof to an appropriate load. Although devices of the type disclosed in this patent appear to work adequately, difficulties in the manufacturing process are evident. In molding the housing around the metallic sleeve, one must block off the flow ports through the sleeve or clean them subsequent to the molding operation. Such steps add significantly to the manufacturing costs thereby defeating the initial goal.

SUMMARY OF THE INVENTION

A direct drive valve which includes first and second molded plastic housing sections ultrasonically bonded together to form a housing. A metallic sleeve which contains machined metering slots is disposed within the housing. The sleeve also defines a plurality of openings at least a portion of which receive fluid under pressure. A spool is disposed within the sleeve. The spool is mechanically linked and displaced by a motor. The valve meters flow through the sleeve's metering slots, which are opened when the spool is displaced. A seal is formed during the ultrasonic weld procedure between the sleeve and the housing around each of those openings which receive fluid under pressure.

The molded plastic housing is manufactured by providing first and second housing sections which are brought together with portions thereof in engagement. one of the housing sections is contacted with an ultrasonic radiating horn. The horn is activated for a time and at an energy level sufficient to melt the contacting portions of the molded plastic housing sections. Thereafter the ultrasonic horn is deactivated and the molten plastic material is allowed to cool.

DETAILED DESCRIPTION OF THE INVENTION

Figure 1:
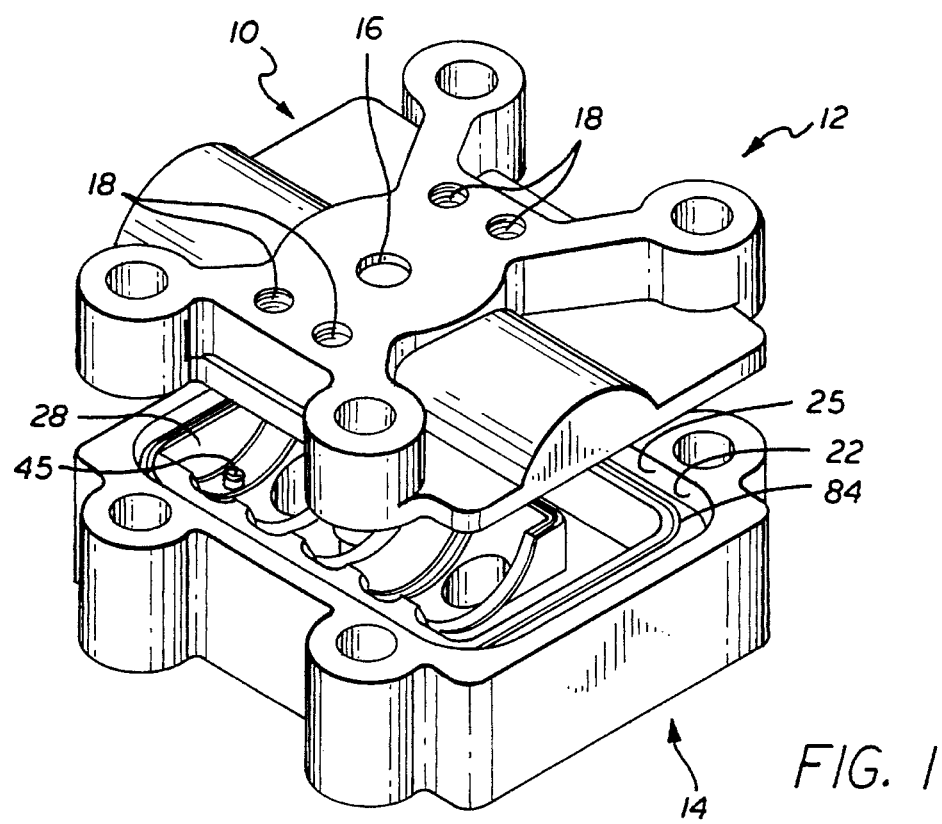
FIG. 1 is a perspective view taken from the top, showing the housing sections prior to assembly.
Figure 2:
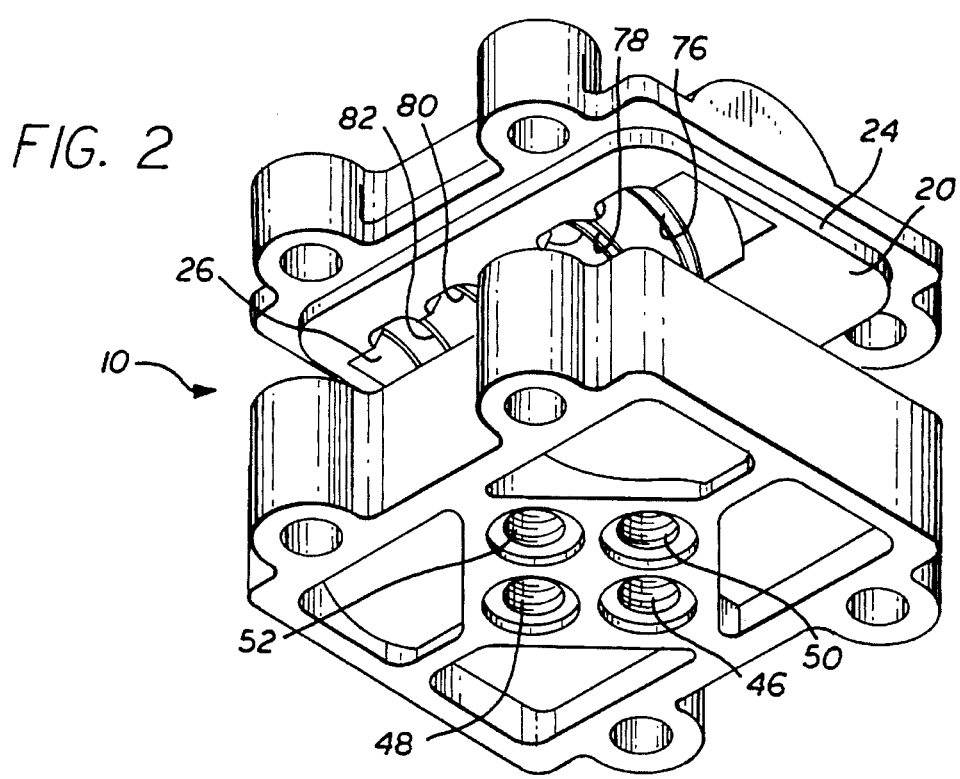
FIG. 2 is similar to FIG. 1, but taken from below.
Figure 8:
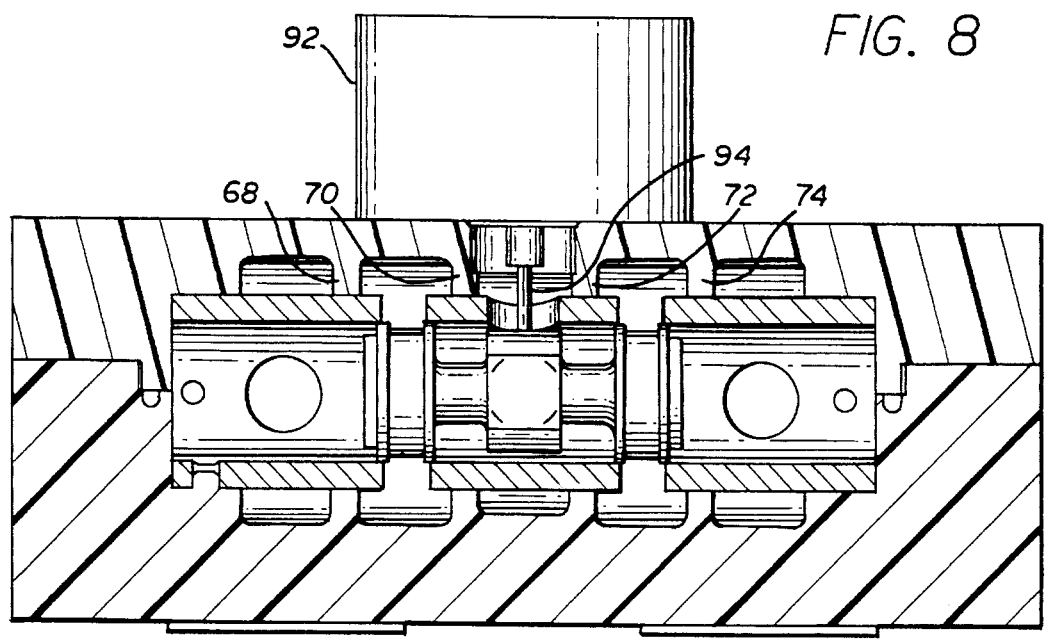
FIG. 8 is a cross-sectional view of the completed valve after being ultrasonically welded and showing the motor means affixed thereto for driving the spool.

Referring now more particularly to FIGS. 1 and 2. The housing 10 for valve construction in accordance with the present invention is shown as including an upper section 12 and a lower section 14. The upper section 12 defines an opening 16 through which a drive member extends to engage the spool as will be more fully described below. The drive member extends from a drive motor (FIG. 8) which is secured in place by appropriate fasteners which engage additional openings 18. The upper section 12 includes a protrusion or extension 20 which when finally assembled extends into and is matingly received by a corresponding depression or cavity 22 in the lower section 14. However as shown in the disassembled and exploded views of FIGS. 1 and 2, the extension 20 defines a continuous peripheral surface 24 adjacent the outer edge of the housing section 12. The depression 22 defines a continuous peripheral surface 25 adjacent the outer edge of the housing section 16. The protrusion 20 is slightly larger than the depression 22 so that the peripheral surfaces 24 and 25 provide a continuous peripheral interference therebetween preventing the mating of the protrusion 20 within the depression 22. However during manufacture the two housing halves are brought together with the protrusion 20 in contact with the depression 22 so that the surfaces 24 and 25 are in the interference relation. At that time ultrasonic energy is applied along with a compressive force such that the surfaces 24 and 25 melt and the protrusion is matingly received within the depression 22. Thereafter the ultrasonic energy is removed and the molten plastic material allowed to cool thereby forming a fusion bond between the two housing sections 12 and 14 thus effecting a liquid-tight seal about the outer edge of the valve housing 10.

Figure 3:
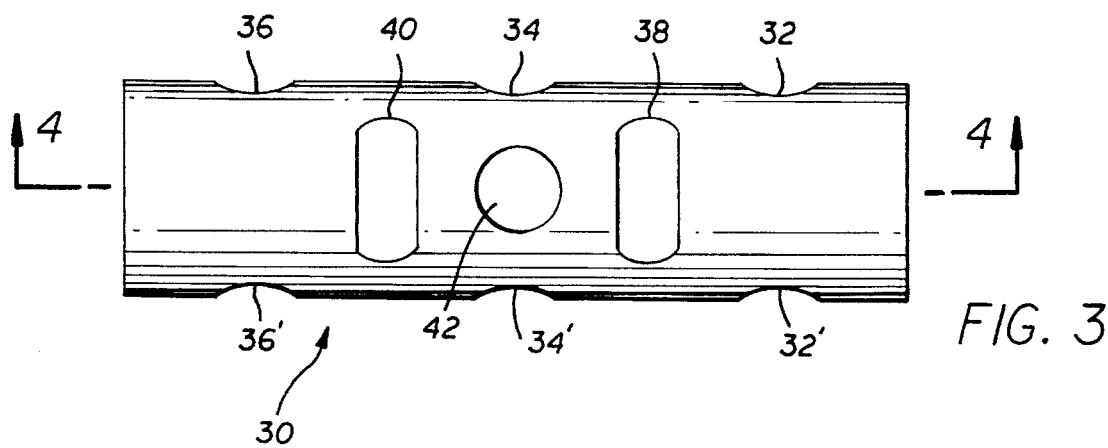
FIG. 3 is a top plan view of a sleeve received within the valve.
Figure 4:
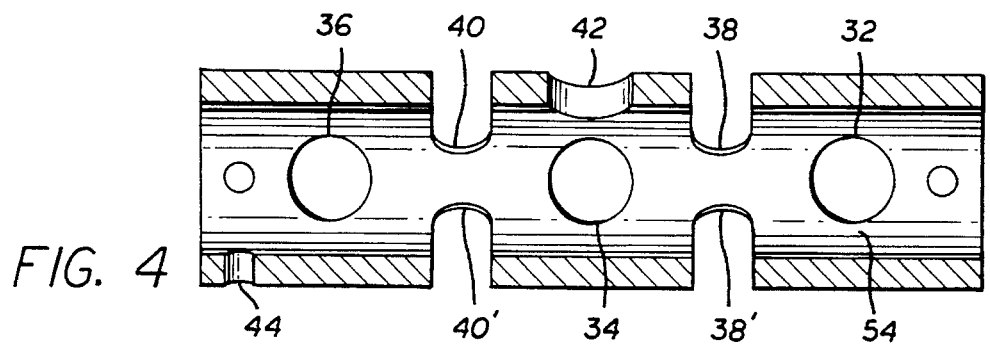
FIG. 4 is a cross-sectional view of the sleeve in FIG. 3 taken about the lines 4—4.

The two sections 12 and 14 each define an opposed semi-circular cavity 26–28 respectively. The cavity formed by these opposed semi-circular portions receives a sleeve 30 as shown in FIGS. 3 and 4. The sleeve 30 is a hollow tubular member having a plurality of ports as shown at 32 through 40 formed therein. In addition an opening 42 is provided which is aligned with the opening 16 in the upper section 12 of the housing 10 to receive the drive member above referred to. The sleeve 30 also provides an additional opening 44, which is utilized to align the sleeve 30 in the proper position within the lower section 14 of the housing 10. The opening 44 receives a clocking or indexing pin 45 during the assembly process to be described later. By positioning the clocking pin 45 in the opening 44, the various openings 32, 40, and 42 are properly aligned to function in conjunction with the openings 46 through 52 provided in the lower section 14 of the housing. The opening 46 is connected to a source of fluid under pressure (not shown), while the opening 52 is connected to the return thereof. The openings 48 and 50 are utilized to connect the valve to a using apparatus such as an actuator or the like.

Figure 5:
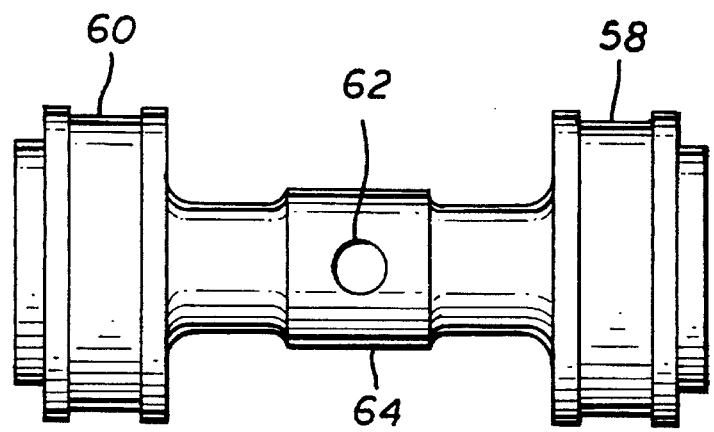
FIG. 5 is a top plan view of the spool which is received within the sleeve as illustrated in FIGS. 3 and 4.

Positioned within the bore 54 of the sleeve 30 is a spool 56 as is shown in FIG. 5. The spool includes a pair of lands 58 and 60 which open and close the ports 38 and 40 to control the flow of fluid under pressure from the source to the load. A centrally disposed opening 62 is provided within a center member 64 of the spool 56. The opening 62 receives the drive member from the drive motor which is utilized to reciprocate the spool 56 within the sleeve 30.

During operation it is desirable to isolate the flow ports 38, 40-38',40' from the return ports 34, 34'. To accomplish this, there is provided in the cavity defined by the opposing semi-circular cavities 26 and 28 a plurality of isolation ribs 68, 70, 72 and 74. Each of these ribs includes an energy directing bead shown at 76 through 82 in FIG. 2. When the structure is assembled and subjected to ultrasonic energy, these energy directing beads melt and as the housing sections 12 and 14 are moved toward each other the molten material forms an intimate contact around the outer surface of the sleeve 30, thereby sealing the ports which contain the flowing high pressure fluid.

Figure 7:
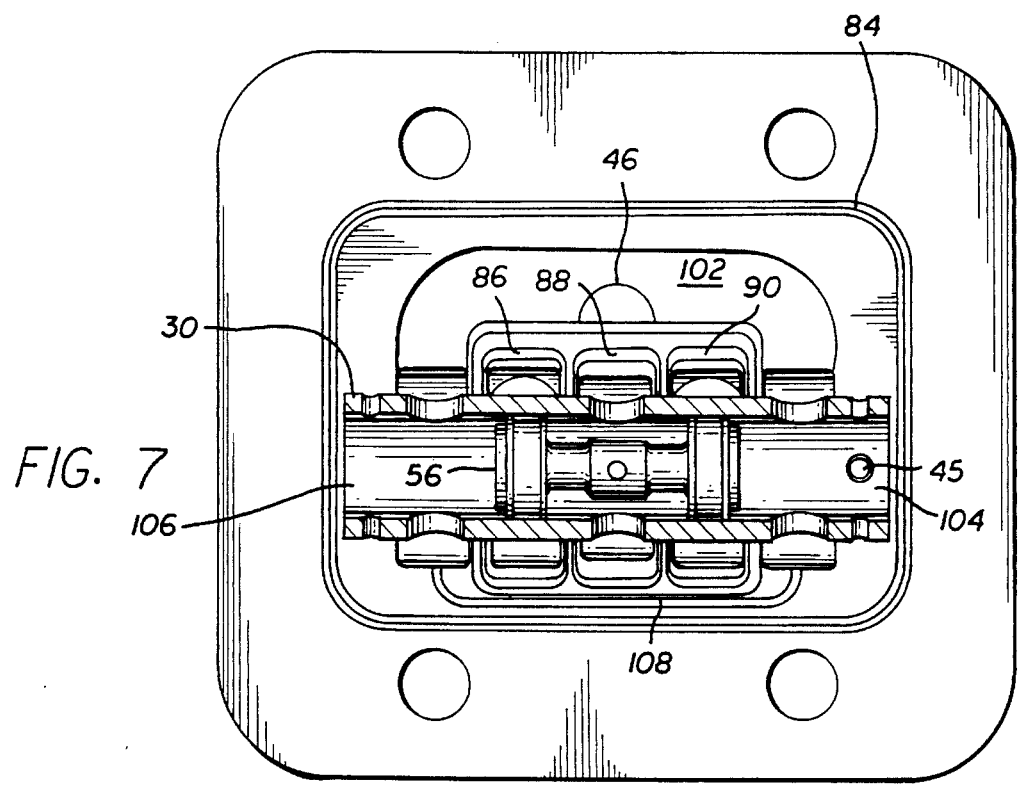
FIG. 7 is a top plan view of the lower section of the housing showing the sleeve and spool in position therein.

It is also important to isolate these ports one from the other and to also contain the high pressure fluid internally of the housing 10. Such is accomplished by providing the energy directing beads as is shown in FIG. 7 at 84 on the lower housing section 14 and at 86, 88 and 90. When the extension 20 is inserted into the mating cavity 22, the surface 24 thereof engages the energy directing beads 84 through 90. Pressure and ultrasonic energy is applied. As a result, these energy directing beads along with the energy directing beads 76 through 82 melt. When the energy directing beads 84 through 90 melt, the material adjacent thereto in the upper section 12 of the housing 10 also melts. Upon release of the ultrasonic energy the melted material cools and causes a fusion bonding to occur. Such fusion bonding immediately seals the upper and lower sections 12 and 14 of the housing 10 together and as well isolates the flow ports defined by the sleeve 30.

Figure 9:
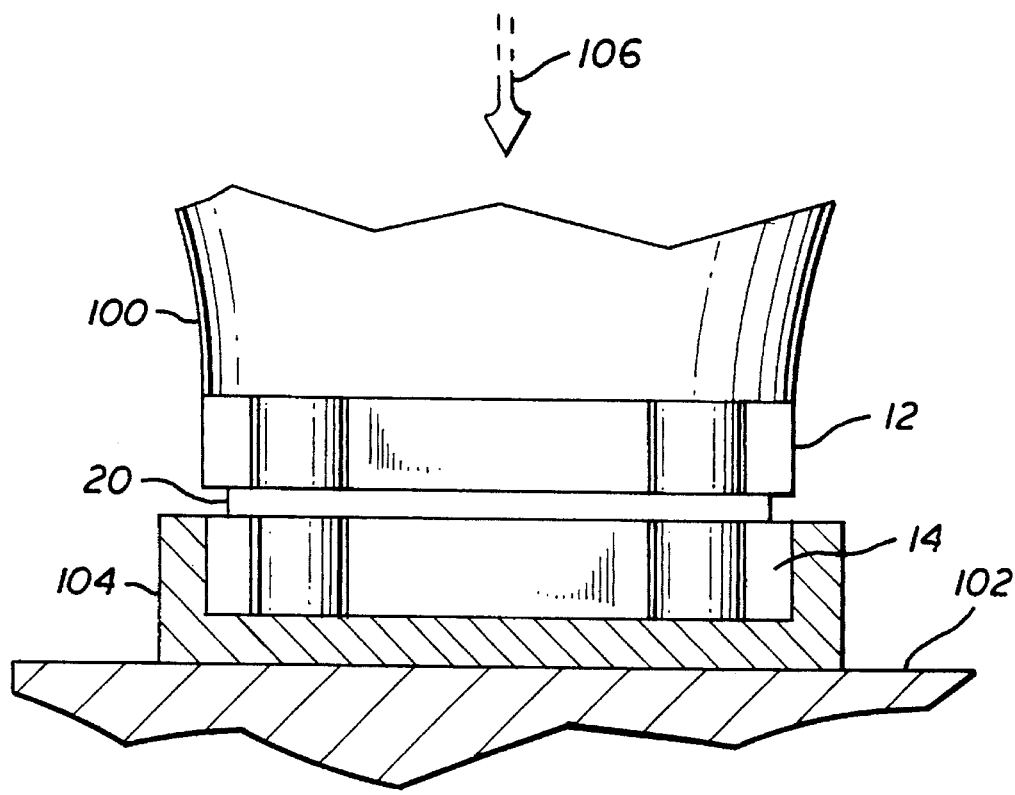
FIG. 9 is a schematic diagram of an apparatus for fabricating the molded plastic housing of the present invention.
Figure 6:
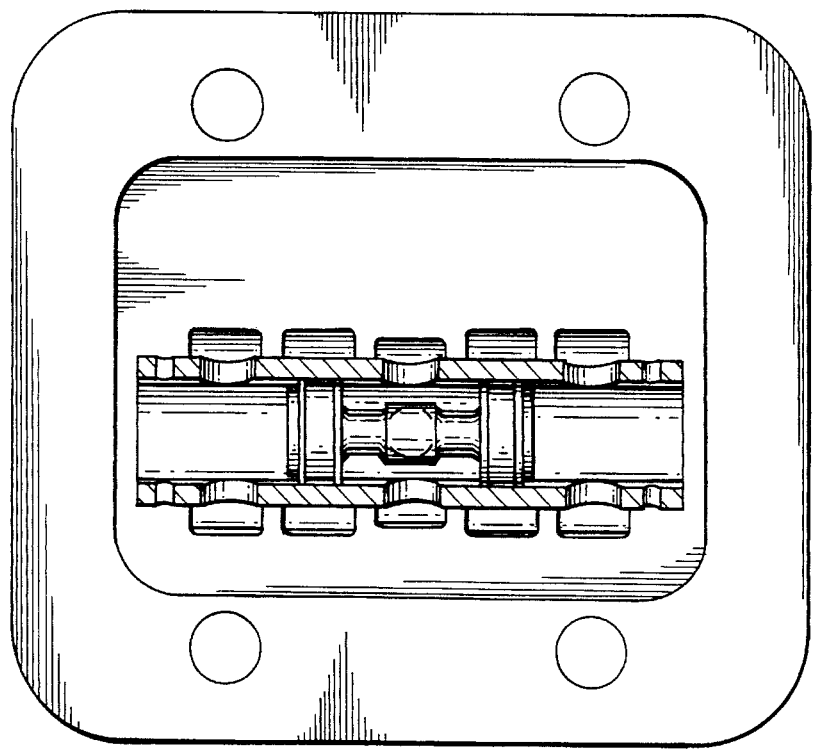
FIG. 6 is a bottom plan view of the upper section of the housing showing the sleeve and spool in position therein.

In assembly of the valve constructed in accordance with present invention, the spool 56 is inserted within the bore 54 of the sleeve 30. The sleeve 30 is then placed within the semi-circular cavity 28 so that the opening 44 is engaged by the clocking pin 45 to properly align the various ports and openings as above described. With the spool rotated so that the opening 62 is aligned with openings 16 and 42 an appropriate retaining device is inserted to maintain the spool in the proper aligned position. Thereafter, as shown in FIG. 9, an ultrasonic horn 100 is brought into engagement with the upper section 12 of the housing 10, while the lower section 14 is supported upon an appropriate support mechanism 102. The lower section 14 may also be received within an appropriate support fixture 104 to hold it rigid as the interference surfaces melt. Pressure is then applied as shown by the arrow 106 to urge the section 12 toward the section 14. Power is supplied to activate the ultrasonic horn over time and in an amount sufficient to accomplish melting of the various energy directing beads above referred to. At the same time a melting of the material adjacent the beads in the upper section 12 of the housing 10 also occurs. Upon deactivation of the ultrasonic horn, the molten plastic material cools and a fusion bonding occurs between the housing sections. In addition, the various beads on the ribs 68 through 74 will have melted providing a seal between the various ports in the sleeve 30 as above described. Also, as above described melting and fusion of the surfaces 24 and 25 on the protrusion 20 and the opposed recess 22 on the lower section 14 provides a sealed shear joint. This shear joint provides the primary bond for holding the housing halves 12 and 14 together and the fluid tight seal to prevent external leakage. It should also be noted that through this ultrasonic welding process the spool and sleeve are encapsulated within the housing and that the usual end plates have been eliminated.

Thereafter, a motor 92 having a drive shaft 94 extending therefrom is brought into position on top of the completed housing. The drive shaft 94 is inserted through the openings 16 and 42 so as to engage the openings 62 in the spool 56. Thereafter the motor 92 is secured to the upper section 12 of the housing 10 by the positioning of appropriate fasteners received within the openings 18. Subsequent thereto electrical signals can be applied to the motor 92 to cause rotation of the drive shaft 94 which is eccentrically mounted on the motor 92 as is well known in the art. Reference is hereby made to U.S. Pat. No. 5,146,126 which describes such a device and is incorporated herein by reference. Upon arcuate movement of the drive shaft 94, the spool 56 is reciprocated within the sleeve 30 to control the flow of fluid as is above described.

As is shown more specifically in FIG. 7, fluid under pressure is applied through the opening 46 and is received within the passageway 102. The passage way causes the fluid to appear at opposite chambers 104 and 106 within the sleeve 30. As the spool 56 reciprocates, the control ports 38 or 40 are uncovered depending upon the direction of movement of the spool 56. As a result, fluid will flow through such ports and out the openings 48 or 50 to the appropriate using apparatus. Fluid will flow from that apparatus through the opening 52 and the ports 34 to return. To pressure balance the spool 56 within the sleeve 30 there is provided a small conduit 108 between the chambers 104 and 106. As a result, any unbalances in pressure across the lands of the spool 56 as a result of the flow therethrough will be substantially equalized.

What is claimed is:

1. A direct drive valve comprising:
   (a) first and second molded plastic housing sections ultrasonically bonded together to form a housing;
   (b) a metallic sleeve disposed within said housing and defining a plurality of openings therethrough, at least a portion of said openings receiving fluid under pressure;
   (c) a seal formed by contact between said sleeve and said housing around each of said portion of said openings for preventing leakage of said fluid under pressure;
   (d) a spool slidably disposed within said sleeve; and
   (e) a means coupled to said spool for moving said spool responsive to control signals for controlling the flow of fluid under pressure through said valve.

2. A direct drive valve as defined in claim 1 wherein said means for moving said spool includes a motor affixed to said first plastic molded housing section and a drive shaft extending therefrom into engagement with said spool.

3. A direct drive valve as defined in claim 1 wherein said seal between said sleeve and said housing is defined by a plurality of energy directing beads each of which is melted during said ultrasonic bonding thereby to form intimate contact between said sleeve and said housing.

4. A direct drive valve as defined in claim 1 which further includes an indexing pin means extending from one of said first and second molded plastic housing sections, said metallic sleeve defining alignment means therein, said alignment means on said sleeve engaging said indexing means.

5. A method of molding a direct drive valve having a molded plastic housing comprising:
   (a) providing first and second molded plastic housing sections defining opposed cavities adapted to receive a metallic sleeve having a plurality of spaced openings therein, each of said cavities having first energy directing beads engaging said sleeve at positions displaced from said openings;

(b) bringing said first and second housing sections into engagement with each other with said sleeve positioned within said cavities with said beads in engagement therewith;

(c) contacting one of said sections with an ultrasonic radiating horn;

(d) activating said horn for a time and at an energy level sufficient to melt said energy directing beads; and (e) deactivating said horn and allowing said molten plastic material to cool.

6. A method as defined in claim 5 which further includes second energy directing beads disposed on at least one surface of one of said housing sections and surrounding said cavity therein, contacting said second energy directing bead with an opposed surface on the other of said housing sections, causing said second energy directing bead and material adjacent thereto on said opposed surface to melt during activation of said ultrasonic horn, and allowing said molten material to cool upon deactivation of said horn to thereby provide a leak proof seal for said housing.

7. A method as defined in claim 5 which further includes providing a protrusion having a continuous periphery extending from the surface of one of said housing sections, providing a depression having a continuous periphery in the surface of the other of said housing sections, the periphery of said protrusion being slightly larger than the periphery of said depression to provide a continuous peripheral interference preventing mating of said protrusion within said depression; causing said interference and adjacent material to melt during activation of said ultrasonic horn and said protrusion to mate within said depression, and allowing said molten material to cool upon deactivation of said horn to thereby provide a continuous leak proof seal for said housing.

* * * * *